Sept. 24, 1935.  A. E. DRISSNER  2,015,396
VALVE
Filed June 17, 1933
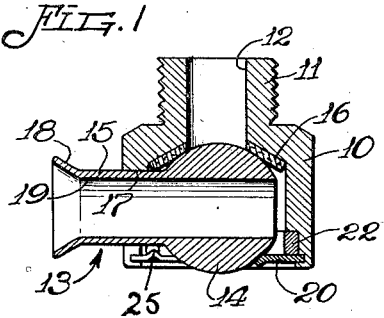
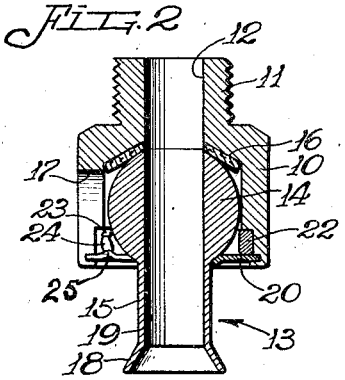
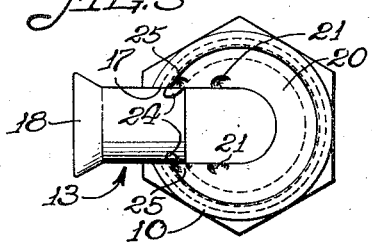
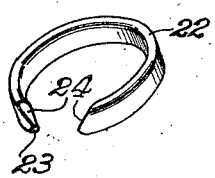
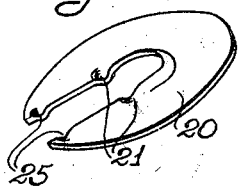
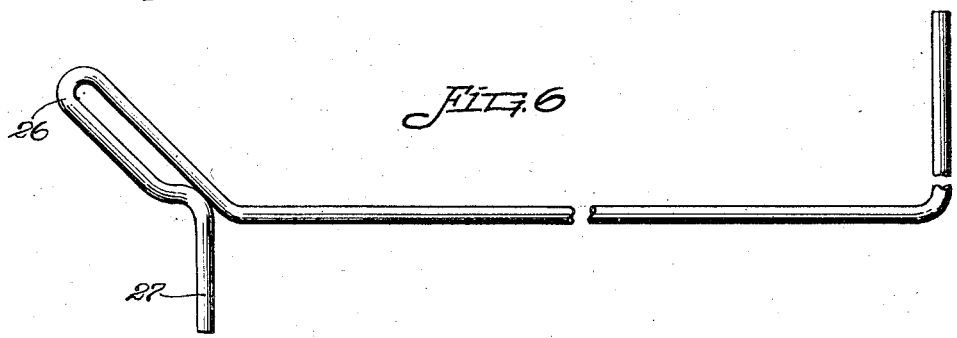
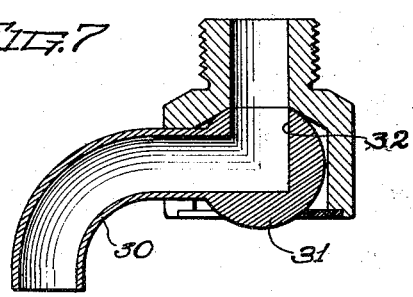
Inventor
Alfred E. Drissner
By Chindell Parker Carlson
Attorneys Patented Sept. 24, 1935

2,015,396

UNITED STATES PATENT OFFICE 2,015,396

VALVE

Alfred E. Drissner, South Euclid, Ohio, assignor, by mesne assignments, to Sears, Roebuck and Co., Chicago, Ill., a corporation of New York Application June 17, 1933, Serial No. 676,275

5 Claims. (Cl. 251—9)

The invention relates generally to valves and more particularly to a valve for controlling the flow of fluid and manually movable for opening and closing it.

The general object of the invention is to provide a valve which is extremely simple and inexpensive in construction and efficient in operation.

Another object is to provide a valve having a spout which serves as a handle for operating the valve.

A further object is to provide a valve having a spout serving as a handle for opening and closing the valve and having yieldable means for securely holding the spout in its open and closed positions.

A specific object of the invention is to produce a novel valve in which a unitary element constituting both a valve member and a discharge spout is provided with a continuous passage through the valve member and spout which, by the shifting of said unitary element, is brought into and out of registry with a passage in the valve casing to control the flow of fluid through the valve as a whole.

Other objects and advantages will become apparent from the following description taken in connection with the accompanying drawing, in which:

Figure 1 is a longitudinal sectional view of a valve embodying the features of the invention and showing the valve in closed position.

Fig. 2 is a view similar to Fig. 1 but showing the valve in the open position.

Fig. 3 is an end view of the valve in closed position.

Figs. 4 and 5 are perspective views of parts of the device.

Fig. 6 is a view of an operating handle for the valve.

Fig. 7 is a longitudinal sectional view, similar to Fig. 1, but of a modified form of valve.

The exemplary embodiment of the invention comprises generally a hollow body having a passage opening into the interior thereof. Within the body is a spout comprising a valve portion, spherical in form, seated in the opening of the passage, a gasket being interposed therebetween, the valve portion being arranged to close off the passage. Extending from the valve portion is a stem portion with a passage extending through the two portions which is arranged to be brought into register with the passage in the body on rotation of the spout to open the valve. Resilient means is provided for holding the valve in its open or closed positions.

As shown in the drawing, the preferred form of the valve comprises a body 10 having an attaching portion such as an externally threaded stem 11. The external shape of the body is such that it may be readily gripped by a wrench or the like, the shape shown in the drawing being hexagonal. The body is preferably cup-shaped and a passage 12 in the stem 11 opens into the interior of the body.

Mounted within the body and extending therefrom is a spout, indicated generally at 13, comprising a valve portion 14 and a stem portion 15. The passage 12 in the body is round while the valve portion 14 of the spout is spherical with its center lying on the axis of the passage 12 and is of slightly larger diameter than the passage 12 so that the spherical portion may be seated in the opening of the passage to form a closure therefor, an annular gasket 16 of leather or the like being interposed between the spherical portion and the body. Thus, the portion of the body surrounding said opening, with the gasket 16, constitutes a valve seat. The stem portion 15 extends radially from the spherical portion 14, a notch 17 being cut in the side wall of the body to receive the stem. The stem portion may be provided with a flared end 18. Extending through the two portions of the spout is a passage 19. To open the valve, the spout is adapted to be rotated within the body about the center of the spherical portion to bring the passage 19 in register with the passage 12 in the body. Thus, the valve may be opened or closed merely by turning the spout.

To retain the spout in the body and to hold the spherical portion tightly against the seat, resilient means is provided, which, in the present instance comprises a spring washer 20 seated against a shoulder in the open end of the body and rigidly secured at its periphery as by peening the body at the periphery of the washer. The washer is also notched to conform with the notch 17 in the body, so that the stem may be rotated. To assist in assembling the device, the washer 20 is provided with a pair of indentations 21 which bear against the spherical portion of the valve to the left side of the center line thereof, as viewed in Fig. 3, to hold the spherical portion firmly seated in the body while the body is being peened over the periphery of the washer.

To securely hold the valve in its closed or open positions, yieldable means is provided which comprises, in the present instance, a split ring 22 made of spring material and seated against a shoulder cut in the body inside of the washer 20, with the split alined with the notch 17 in the body. The ends of the ring at the split are provided with two cam surfaces 23 and 24 against which stem 15 bears to spread the ring as the stem is moved from one position to the other. Preferably, the cam surface 23, against which the stem bears when moving from closed to open position, is small and abrupt so that considerable force is required to open the valve, thus preventing accidental opening of the valve. On the other hand, the cam surface 24, against which the stem bears when moving from open to closed position, may be larger to permit the valve to be easily closed.

To hold the split in the ring 22 in alinement with the notch in the body, the washer 20 is provided with a pair of indentations 25 adjacent the notch in the washer, which abut against the cam surfaces 24.

The operating handle shown in Fig. 6 is provided so that the valve, when used in a position which may not be easily reached, such as when used as a drain plug for the crank case of an automobile, may be easily operated. The operating handle in the instance mentioned, is sufficiently long to extend under the automobile from the side thereof and is provided with two arms 26 and 27 at different angles to the handle, either of which may be inserted into the spout to open or close the valve.

In the modified form shown in Fig. 7, the structure of the body is generally the same as that shown in Figs. 1, 2 and 3. The spout, however, is of the faucet type and comprises a curved stem 30 and a spherical valve portion 31 having a passage 32 at a right angle to the stem so that the valve may be open when the stem is in the position illustrated. If desired, the gasket between the spherical portion and the spring ring may be omitted.

In operation, Fig. 1 shows the valve closed, since the passage 19 in the spout is out of register with passage 12 in the body, the spherical portion of the spout completely closing off the passage 12. To open the valve, the stem 15 may be manually grasped, or a tool such as the rod shown in Fig. 6 inserted into the stem, and the stem turned downwardly to bring the passage 19 in the spout into register with the passage 12 in the body. The spring washer 20 retains the spherical portion firmly within the body in either position and the spring ring 22 yieldably holds the valve against movement from one position to the other. When the valve is opened, it will be noted that an unobstructed passage is provided permitting fluid to flow freely therethrough.

In Fig. 7, the valve is shown open. To close it, the stem 30 is moved downwardly to rotate the spherical portion and move the passage 32 out of register with the passage in the body.

From the above description, it will be apparent that I have provided a valve which is extremely simple and inexpensive to construct, and which is efficient in operation. The valve is operated merely by moving the spout through a small angle, and when open, a relatively large unobstructed passage for the flow of fluid is provided. It is also firmly but yieldably held in either its open or closed position.

I claim as my invention:

1. A valve comprising, in combination, a hollow body having an inlet passage in one side, an open side opposite said inlet passage and a notch in a third side located between the two first mentioned sides, a spring washer mounted in said open side and having a notch registering with the first mentioned notch, and a movable unitary element constituting a valve member and a spout having a continuous passage therethrough, the valve member being located within said body and the spout projecting out through said notches when in one position, said valve member being spherical in form and being held by said spring washer in abutment about the inner end of said inlet passage, said unitary element being rotatable to swing said spout from one position to another in said notches and to carry the passage through said unitary element into and out of registry with said inlet passage.

2. A valve comprising, in combination, a body with a passage opening into the interior of the body, a spout comprising a circular valve portion rotatably mounted within the body and a stem portion extending from said valve portion, said spout having a passage extending through said portions and being adapted to be rotated to open and close the valve, resilient means for holding said valve portion seated in the opening of the passage in the body, and means for yieldably holding said spout in either its open or closed position.

3. A valve comprising, in combination, a body having a passage opening into the interior of the body, a spout comprising a spherical valve portion for closing the inner end of said passage in the body and a stem portion extending from said spherical portion with a passage extending through said portions, said spout being rotatable to move said passages into and out of registry, said body having a notch to receive said stem portion in one of its positions, and means for yieldably holding said spout in either of its positions comprising a spring ring secured within the body and having a split alined with the notch in the body, and of slightly less width than the diameter of said stem whereby said stem will expand said ring in moving from one position to the other.

4. A valve comprising, in combination, a body with a passage opening into the interior thereof, a spout comprising a valve portion seated in the opening of the passage and a stem portion with a passage extending through said portions, said spout being rotatable to move said passages into and out of registry, a spring washer bearing against the valve portion to hold it in seated relation with the opening in the body, said body and said washer being notched to receive said stem portion in one of its positions, and a spring ring having a split alined with said notch and of less width than said stem portion with a pair of cam surfaces on each end of the ring whereby said ring will be caused to expand by movement of said stem portion from one position to the other, the cam surfaces facing the closed position being abrupt to hold the valve securely in its closed position, said washer having portions preventing rotation of said ring.

5. A valve comprising, in combination, a body having a passage, a spout comprising a valve portion movably mounted within the body and a stem portion extending from said valve portion, said spout having a passage adapted to be moved in and out of registry with the passage in the body on movement of the spout, and means for holding said spout in either of its positions and comprising a spring ring having a split of slightly less width than the diameter of said stem, said stem on movement of said spout being movable through the split in said ring whereby said stem will expand said ring in moving from one position to the other.

ALFRED E. DRISSNER.